Oct. 13, 1959   D. A. KOHL   2,908,595
COATING AND GRINDING METHOD OF MAKING A HUMIDITY SENSOR
Filed Nov. 25, 1955

INVENTOR.
DOUGLAS A. KOHL
BY
Stuart R. Peterson
ATTORNEY

Oct. 13, 1959
D. A. KOHL
2,908,595
COATING AND GRINDING METHOD OF MAKING A HUMIDITY SENSOR
Filed Nov. 25, 1955
2 Sheets-Sheet 2
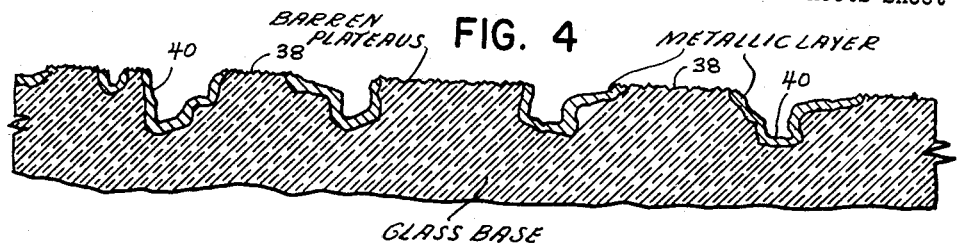
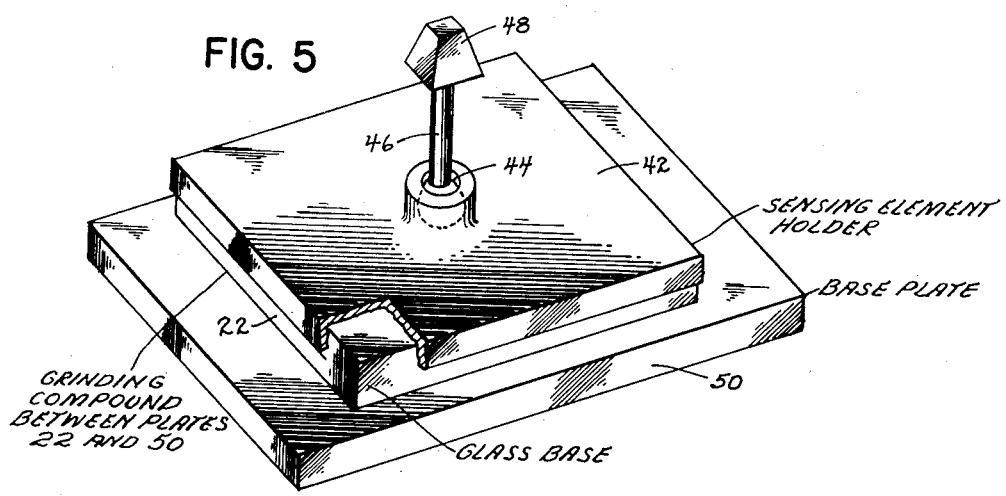
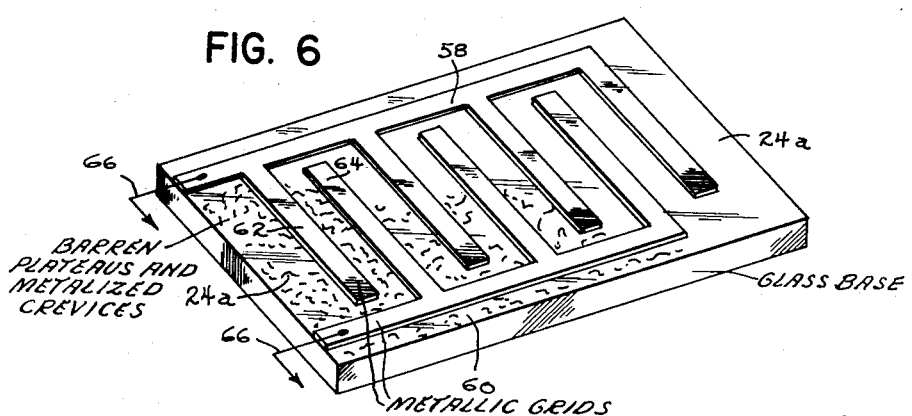
INVENTOR.
DOUGLAS A. KOHL
BY
Stuart P. Peterson
ATTORNEY

United States Patent Office 2,908,595
Patented Oct. 13, 1959

2,908,595

COATING AND GRINDING METHOD OF MAKING A HUMIDITY SENSOR

Douglas A. Kohl, Osseo, Minn., assignor to General Mills, Inc., a corporation of Delaware Application November 25, 1955, Serial No. 549,115

3 Claims. (Cl. 117—212)

This invention relates to a humidity sensor having a comparatively low resistance range and to a method of making such a sensor.

In a number of cases involving the employment of an adsorbing element in humidity sensing operations, it has been found that the resistance range is far too high for proper and economical instrumentation. Having this problem in mind the invention has for an object the lowering of the resistance range sufficiently so that adsorbing materials, otherwise quite impractical, can be used with facility.

A further aim of the invention envisages the control of such resistance range to a preferred extent, thereby adapting a particular adsorbing element to a given instrument environment.

As an aid to understanding better the type of humidity sensor with which the present invention is concerned, it may be explained that the term "adsorbing" is herein defined, in contradistinction to "absorbing," as encompassing or involving a characteristic in which there is a preferential attraction for water vapor molecules and while said molecules are in contact with the adsorber there is no chemical change or irreversible action. Adsorption, on the other hand, occurs when water vapor molecules are actually combined through chemical reaction with the absorber, incorporated into the molecular structure of the absorber (for instance, water of crystallization), or there is a release of ions by virtue of a binding action such that the conduction of electric current by the ions may result in physical changes. Typical of such reactions are the swelling of cellulose and the ion-exchange resins.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Fig. 4 is a view showing a more advanced step of manufacturing the humidity element, this view being after a grinding operation has taken place;

Fig. 5 is a perspective view showing the sensing element in the process of being ground;

Fig. 6 is a perspective view of the finished humidity sensor and

Figure 1:
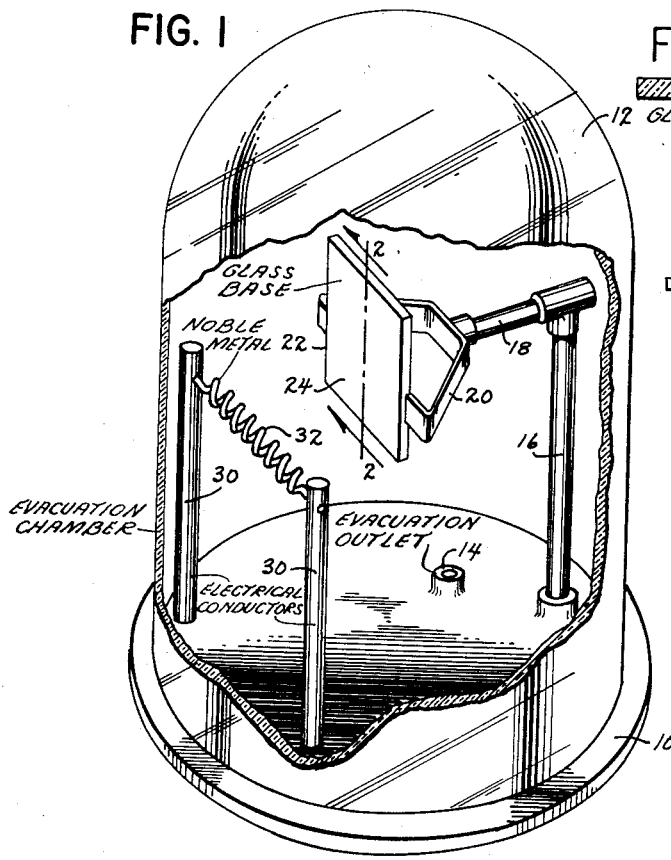
Figure 1 is a perspective view partly broken away showing suitable apparatus for carrying out the improved method or process embodying the invention.
Figure 7:
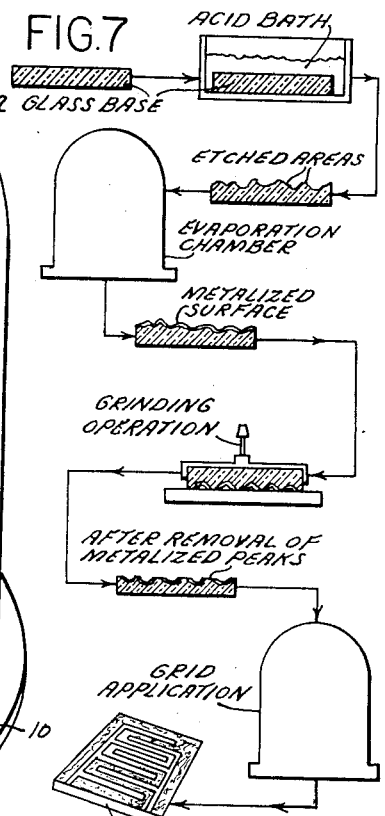
Fig. 7 is a pictorial-type flow chart showing the procedure utilized in constructing my humidity sensor.

Referring in detail to the drawings, particularly Fig. 1 for the moment, this figure illustrates suitable apparatus for carrying out the objects of the invention and suggestively includes a supporting base 10 having mounted thereon a housing 12. The housing need not assume the specific configuration set forth but for purposes of illustration, the housing which has been depicted can take the form of a bell-jar having a semispherical top and an open bottom. For the purpose of permitting evacuation of the housing 12, there is a tubular boss 14 located on the base 10 which leads downwardly to an exhaust pump (not shown).

Enclosed in the housing 12 and mounted on the base 10 is a stand comprising an upright stud 16 having mounted at the top thereof a horizontally extending arm 18. The distal end of the arm 18 is provided with a pair of spring fingers 20, these spring fingers having sufficient resiliency so that they can be spread apart for the ready accommodation of a base element 22 of adsorbing material, such as quartz or high silica glass which is to serve as an integral part of the ultimate humidity sensor.

Figure 2:
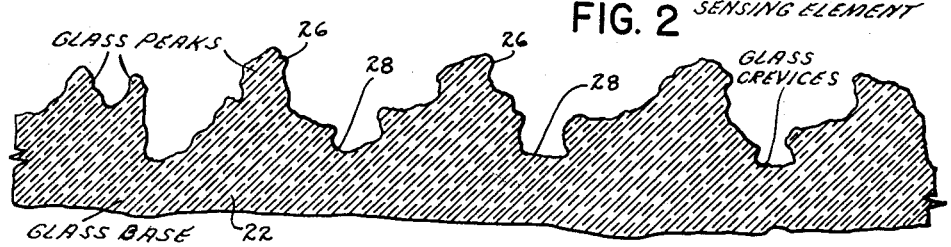
Fig. 2 is a greatly enlarged cross sectional view taken in the direction of line 2—2 of Fig. 1.

While not discernible from Fig. 1 because of the reduced size thereof, nonetheless the element 22 is provided with a roughened face 24. Assuming that we have selected high silica glass as the element 22, the roughening is preferably produced by subjecting the face 24 to an acid etching step. The apparatus for effecting this etching step may be of any conventional type, such as merely dipping the entire element into an etching bath or exposing it to hot acid fumes, so there is actually no need for picturing the apparatus. However, the irregular condition of the face 24 is very important for a full understanding and appreciation of the benefit to be derived from a practicing of this invention. Therefore attention is now directed to Fig. 2 where the cross-sectional make-up of the element 22 is set forth in magnified detail. From Fig. 2 it can be seen that the face 24 is composed of a number of peaks 26 with intervening crevices 28. These crevices 28 are actually formed by removing portions of the glass from an originally planar rectilinear slab. The depth of the crevices 28 can, of course, be controlled by the concentration of the acid etching solution or by the length of time that the surface 24 is subjected to this acid solution.

Figure 3:
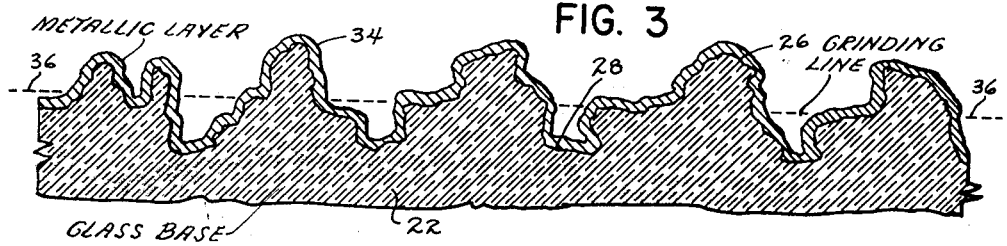
Fig. 3 is a view resembling Fig. 2 but showing the sensing element after a metallic layer has been evaporated thereon.

Continuing now with the description of the apparatus depicted in Fig. 1, having presented an adequate background for an appreciation thereof, it will be noted that such additional apparatus includes a pair of upright posts 30 which support a coiled filament 32, which filament may suggestively contain a noble metal within the coils. The uprights 30 serve to conduct electric current to this filament 32 and by virtue of the electrical resistance thereof, the filament is heated sufficiently so that it evaporates the contained metal in the associated housing 12. The evaporation of this metal takes place in all directions and the metal particles of molecular size proceed in straight line paths, many of them impinging upon the irregular face 24. Consequently, there is produced on the face 24 a metallic layer 34 as can be seen in Fig. 3. This metallic layer 34 is continuous in character, covering all of the peaks and valleys 26 and 28. It might be noted that there is no shielding from the peaks 26 owing to the fact that the filament 32 is disposed directly in front of the element 22, and because of this disposition the metal emanating from the filament strikes all portions of the face 24.

To help in an understanding of just what material is removed by a grinding process presently to be described, there appears on Fig. 3 a dashed line 36. The elevation of this line is purely hypothetical and can be either raised or lowered as circumstances dictate. At any rate, the line 36 represents a line along which the grinding action is to take place, the grinding removing all of the material including both the upper glass peaks 26 and the areas of the metal layer 34 covering these peaked portions. The profile of the element 22 after such removal is pictured in Fig. 4 and it will be observed from this particular figure that what remains after the grinding step is a plurality of generally flat plateaus 38 having a number of recesses 40 situated therebetween. Particular note should be taken of the fact that these recesses 40 retain those portions of the layer 34 which have been deposited therein whereas the plateaus 38 are barren or devoid of any such metal.

One form that the grinding apparatus may take is pictured in Fig. 5, the apparatus there shown comprising a holder 42 for the element 22 equipped with a ball and socket joint at 44. The ball of said joint 44 has an upstanding stem 46 carrying a tapered head 48 for attachment to any motive mechanism such as a planer or telescope lens grinder. Under the element 22 is a base plate 50 of material softer than the element and the grinding compound, preferably #500 or finer grit, is contained in a slurry between the element 22 and the base plate 50. Movement of the holder 42 will of course cause the attrition that results in the condition of the element depicted in Fig. 4.

To distinguish the ground surface of the element 22 from merely the etched surface which has been previously designated by the numeral 24, I will apply the reference numeral 24a to the ground surface appearing in Fig. 6. It might be explained at this time, now that the grinding process has been divulged, that the dashed line 36 representing the plane of grinding can be lowered as hereinbefore stated and such lowering by a deeper grinding cut will be instrumental in reducing the size of the recesses or pockets 40 in connection with the amount of metal lining the same. It is believed self-evident that if these recesses 40 are reduced to any appreciable extent, the concomitant reduction in the amount of metal remaining will correspondingly reduce the over-all conductivity of the face 24a and the resistance range of the element 22 will be greater than that which would be the case if relatively little grinding is performed. It is in this way that control is exercised over the resistance range, and this control can be utilized in producing humidity elements having the desired characteristics. Furthermore, the exposed surface 38 is left in a form which presents good adsorptive properties.

In Fig. 6 the element 22 is depicted in final form. The additional step that has been performed in the making of this element is that of applying suitable metallic grids 58 and 60 to the face 24a, these grids having interleaved fingers 62 and 64, respectively. Although not limited thereto, these grids may be applied in the manner set forth in my co-pending application, Serial No. 549,118, filed November 25, 1955, which application shows the use of an appropriately configured mask through which evaporated metal passes. Suitable conductors 66 may be attached to the grids for connection to the appropriate instruments in measuring the resistance of the element when subjected to various humid states. It may be pointed out that a layer of moisture forming on the finished humidity sensor shown in Fig. 6 will literally bridge the interleaved fingers 62 and 64 and the magnitude of such moisture will determine the over-all electrical resistance of the element.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A method of making a humidity sensor comprising the steps of etching one surface of an inert element of high adsorptivity and having a high electrical resistivity, applying a metallic layer to said surface, removing a portion of said surface and the overlying metallic layer to provide a preferred resistivity so that substantially flat plateaus barren of metal are formed having metallic lined recesses therebetween, and applying interleaved metallic grids to said surface.

2. A method of making a humidity sensor comprising the steps of etching one surface of a moisture adsorbing element of high adsorptivity having a high electrical resistivity to form a multiplicity of peaks and intervening crevices, evaporating a metallic layer onto said surface to cover both the peaks and the crevices, grinding away the uppermost portions of said peaks and the metal overlying same to provide a preferred resistivity and thus to leave substantially flat plateaus barren of metal and intervening recesses lined with metal extending up to said plateaus, and applying interleaved metallic grids to said surface.

3. A method of making a humidity sensor comprising the steps of roughening by etching one surface of a moisture adsorbing element of high adsorptivity having a high electrical resistivity to form a multiplicity of peaks and intervening crevices, depositing a metallic layer to said surface so as to metallically coat said peaks and crevices, removing the upper portions of said peaks and the metal overlying same to provide a preferred resistivity so that substantially flat plateaus devoid of metal are formed leaving the crevices lined with the remainder of said layer extending up to said plateaus, and applying interleaved metallic grids to said surface.

References Cited in the file of this patent

UNITED STATES PATENTS

| | | |
|---|---|---|
| 1,767,715 | Stoekle | June 24, 1930 |
| 2,058,348 | Nichols | Oct. 20, 1936 |
| 2,075,377 | Varian | Mar. 30, 1937 |
| 2,356,910 | Bailey | Aug. 29, 1944 |
| 2,516,986 | Heinse | Aug. 1, 1950 |
| 2,613,302 | Gurewitsch | Oct. 7, 1952 |
| 2,622,178 | Glynn | Dec. 16, 1952 |
| 2,707,880 | Wannamaker | May 10, 1955 |
| 2,792,620 | Kohring | May 21, 1957 |

FOREIGN PATENTS

| | | |
|---|---|---|
| 629,188 | Great Britain | Sept. 14, 1949 |

UNITED STATES PATENT OFFICE
CERTIFICATE OF CORRECTION

Patent No. 2,908,595                  October 13, 1959

Douglas A. Kohl

It is hereby certified that error appears in the printed specification of the above numbered patent requiring correction and that the said Letters Patent should read as corrected below.

Column 1, lines 37 and 38, for "Adsorption" read -- Absorption --; column 2, line 32, for "benefit" read -- benefits --.

Signed and sealed this 20th day of September 1960.

(SEAL)
Attest:

KARL H. AXLINE                      ROBERT C. WATSON
Attesting Officer                Commissioner of Patents